Inventor
Harold William Klas

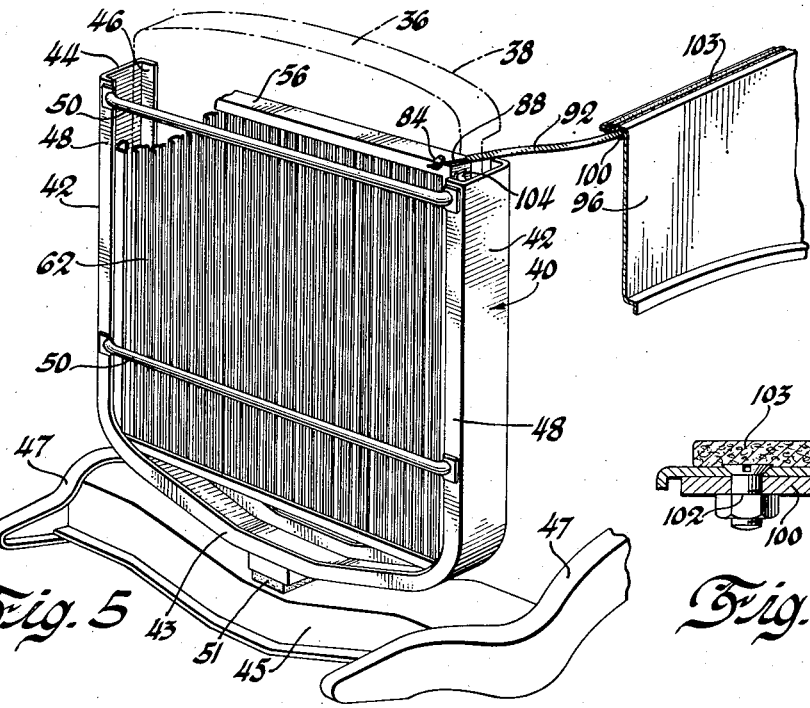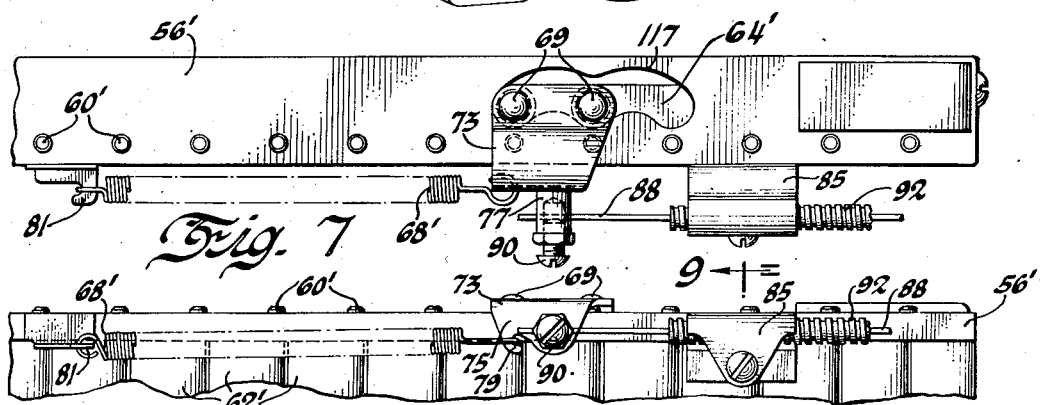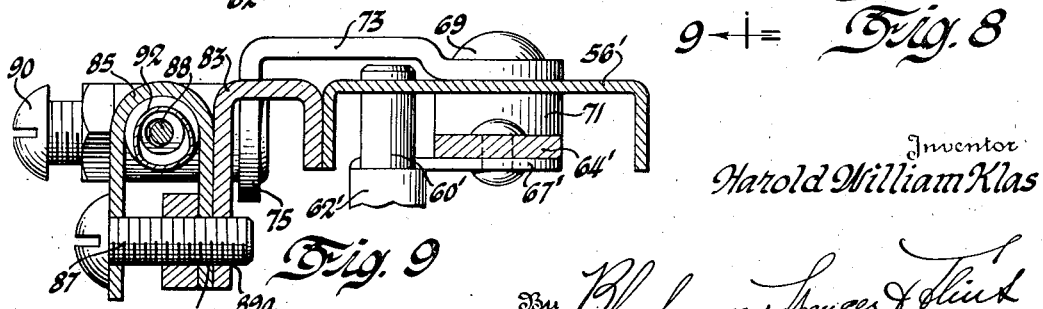

Patented Jan. 9, 1940

2,186,299

UNITED STATES PATENT OFFICE 2,186,299

AUXILIARY SHUTTER

Harold William Klas, Lansing, Mich., assignor to General Motors Corporation, Detroit, Mich., a corporation of Delaware Application February 13, 1937, Serial No. 125,527

7 Claims. (Cl. 180—69)

This invention relates to the cooling systems of internal combustion engines used on automotive vehicles and has particular reference to an installation or an arrangement of parts which enables a shutter to be installed on the vehicle after the vehicle has been built and has left the factory.

The installation of a shutter to control the air flow through the radiator of an internal combustion engine of an automotive vehicle is old. These shutters have been applied in various ways and have added to the cost of the vehicle. In many instances the purchaser does not desire a shutter on his vehicle and would prefer the saving in original cost if the shutter were omitted. On the other hand, other purchasers desire a shutter and are willing to pay the additional cost to have the shutter installed after the car is purchased.

It is the object of the invention so to mount and install the radiator on a frame or harness at the front of the vehicle that a removable shutter may later be slipped into place and operated in the usual way by means of a connection leading from the shutter to the instrument board of the vehicle. The frame or harness of the invention comprises a U-shaped supporting iron, the arms of the U being U-shaped in cross section. The radiator core is fastened to the rearmost flanges of the U-sectioned arms while the front face thereof is spaced from the forwardmost flanges thereof to leave a pocket or space between the core and the front flanges. Between the front flanges and the core a frame containing a radiator is adapted to be slid from the top, and to prevent rattle of the parts the sides of the frame are provided with suitable spring clips to press against the base of the U. To enable the shutter frame to be slipped in place, the interfering parts of the radiator shell, etc. are first removed.

On the drawings

Figure 5 is a perspective detail of a slightly modified form.

Figure 6 is a sectional detailed view showing the manner of holding the shutter operating cable to the vehicle.

Figure 7 is a plan view of a modification.

Figure 8 is a view in elevation of the structure of Figure 7, the lower part being broken away.

Figure 9 is an enlarged detailed sectional view on the line 9—9 of Figure 8.

Figure 1:
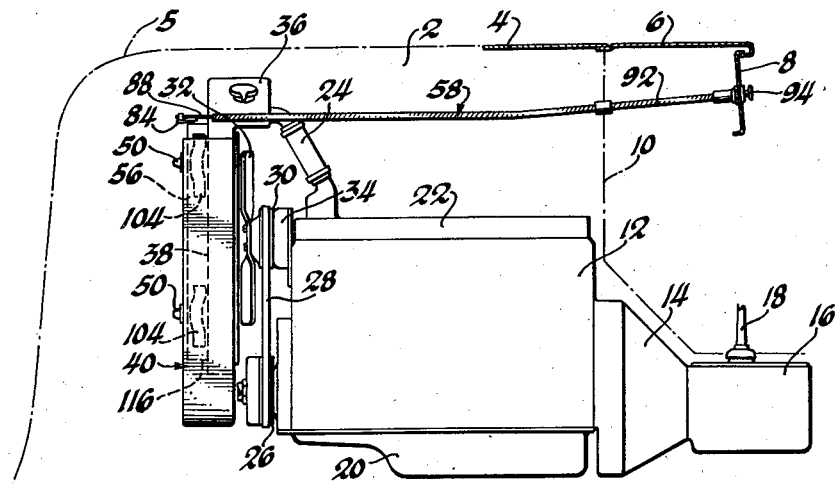
Figure 1 shows in side view a part of an automotive vehicle showing the invention applied.

Referring to the drawings, the numeral 2 indicates the vehicle as a whole. The vehicle has the usual hinged hood 4, radiator shell 5, cowl 6, instrument board 8, dashboard 10, internal combustion engine 12, provided with a clutch housing 14 to enclose the usual clutch related with the transmission inclosed in the housing 16 and operated from the shift lever 18. The engine 12 has the oil pan 20 and the head 22 and is equipped with the usual water cooling system, part of the pipes of which are shown at 24. On one end of the crankshaft there is mounted the usual lower fan pulley 26 over which there is trained the belt 28 which in turn runs over the upper fan pulley 30 to drive the fan 32 and the impeller of the water pump 34. The pump 34 forces the water through the piping 24 into the upper tank 36 of the radiator 38, the radiator being indicated in dotted lines in Figure 1.

The radiator 38 is rigidly mounted in the U-shaped frame or harness 40 which is best shown in Figure 5. The frame or harness 40 is of generally U form and has the upstanding legs 42 and base 43. The base 43 is mounted on the transverse member 45 of the frame 47. A suitable rubber block 51 is positioned between the frame and transverse member 45 so that the U frame 40 is resiliently mounted at a single point.

Figure 2:
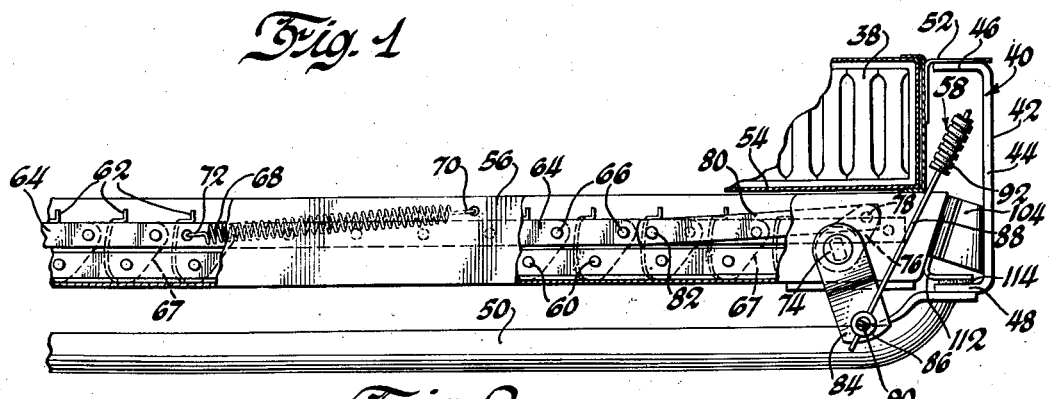
Figure 2 is a plan view of the invention with parts broken away better to illustrate the construction.

Referring to Figures 2 and 5 it will be noted that each of the upright legs 42 of the U harness or frame 40 are U-shaped in cross-section and comprise the web 44, the rear flange 46 and the front flange 48. Suitable braces 50 extend across the front of the frame 40 from one leg 42 to the other rigidly to brace the construction. The harness 40 may be L-shaped in cross-section and have the front flange 48 only. The parts so far described are in general conventional.

Referring to Figure 2, it will be noted that the core of the radiator 38 is rigidly secured to the flange 46 by the angle iron straps 52 which have one wing welded to the outside of the flange 46 and the other wing welded to the side of the radiator core rigidly to hold the radiator core 38 in place. One angle iron 52 is used at each side of the vehicle. The front face 54 of the radiator core is spaced a considerable distance from the front web 48 of the arm 42 so that a pocket or space is provided between the front face of the radiator core and the flange 48. In this space there is slid the shutter frame 56 containing the conventional type of shutter. The vehicle as it leaves the factory has no shutter in place, and in case the customer should desire a shutter installed on his car this can be done by removing the usual shell or other parts surrounding the upper end of the harness 40 over the radiator and sliding the shutter frame in place. After the application of the operating mechanism 58 the radiator shell, etc., may be reattached in place to give the vehicle its original construction and appearance.

The shutter frame 56 is rectangular and has pivotally mounted at the top and bottom thereof by means of the pivots 60 the shutter blades 62. All of the shutter blades 62 are connected to the longitudinal rod 64 by means of the pivots 66 secured to inturned wings 67 on the blade ends. A spring 68 has one end 70 secured to the frame 56 and the other end 72 fastened to the bar 64 so that the spring constantly urges the bar and the blades 62 to the open position shown in Figures 2 and 4. At the right end of the frame 56 in Figure 2 there is mounted a stud 74. To the lower end of this stud there is secured the lever 76, pivoted at 78 to a link 80, pivoted at 82 to the bar 64. The upper end of the stud 74 has secured thereto the lever arm 84 which in turn has a stud 86 mounted thereon. The stud 86 has an opening therein for the reception of the end of the wire 88, and a screw 90 screw threaded into the top of the stud rigidly binds the end of the wire 88 to the stud 86. The operating wire 88 passes through a casing 92 to the dashboard 8 where it is operated from the handle 94.

The manner in which the casing 92 is mounted in the vehicle is best shown in Figures 5 and 6. The hood side 96 is preferably rigidly but removably secured to the side of the vehicle and is not hinged as is the customary practice. The upper part of the side 96 is inwardly bent at 98 and has secured under the flange 98 the fastener 100, secured to the flange 98 by means of the bolt and nut 102. The flange 98 has a sound deadening strip 103 secured in a rabbet at the flange edge, the strip 103 serving as a rest for the edge of the hinged section 4 of the hood. At the angle between the parts 96 and 98 the fastener 100 is rounded to hold the casing 92 snugly in the corner. Preferably two such fastening devices as shown in Figure 6 are used to hold the casing in place.

Figures 3, 4:
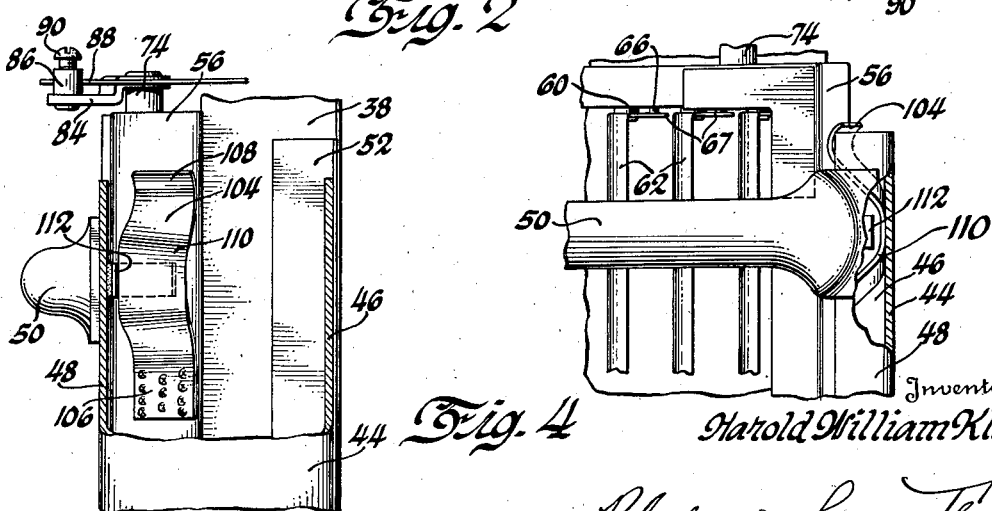
Figures 3 and 4 are enlarged detail views showing the manner of securing the shutter frame in the radiator supporting frame.

Referring to Figures 3 and 4, it will be seen that the side of the frame 56 is provided with spring clips 104 at its top and bottom part, the spring clips being secured at one end as at 106 by welding to the frame side. At its free end 108 the spring has a slightly curved part which merges into the central arched part 110. When the frame 56 is slid in place into the U-shaped harness between the front face 54 of the core 38 and the flange 48, the spring clips 104 will be flattened somewhat to cause the turned end 108 to move slightly over the edge of the frame 56. This compressing of the spring clips 104 will prevent rattle of the frame and hold it in position.

Under the arched part of the spring clips 104 the angle irons 112 are provided. One wing of the angle iron is secured to the side of the frame 56 while the other wing has a sound deadening material 114 secured thereto and abuts against the inside of the flange 48 to prevent rattle and movement of the parts.

The operation of the shutter of Figures 2, 3, and 4 is as follows: assuming the parts to be in the position shown or in the open position of the shutter and the operator wishes to close the shutter to reduce the entrance of air, the operator will pull on the knob 94 at the instrument board which will pull the wire 88 to swing the lever 84 to the right in Figure 2 which in turn will throw the lever 76 to the left to push the link 80 and operate the bar 64 to swing all of the shutter blades 62 on their pivots 60 to close the shutter. This movement will increase the tension on the spring 68. A suitable mechanism such as a spring operated toothed and notch connection (not shown) is provided at the dash at the knob 94 to hold the shutter in closed position. When the operator wishes to close the shutters he will release the connection at the dash and allow the spring 68 to pull the shutters to the open position shown in Figure 2.

In Figure 5 the blades 62 of the shutter are shown as extending to the base 43 of the harness 40. Where the radiator core 38 does not extend all the way to the lower part of the uprights 42 of the harness, the shutter frame may stop close to the bottom of the radiator as indicated at 116 in Figure 1. Any suitable stops or rest may be applied to the harness at 116 to limit the downward movement of the shutter frame. However, where the radiator extends substantially to the bottom of the harness, the longer shutter as shown at 62 in Figure 5 is used.

In the species of Figures 7, 8, and 9, the shutters are shown as operating in a different manner, that is, the spring 68' always tends to pull the shutters to closed instead of open position. The blades 62' are pivoted on the studs at 60' and are interconnected in the usual way by means of the bar 64' which is fastened to wings or fingers 67' on each shutter blade 62'. The frame 56' of the shutter has an opening 117 at its top and through the opening there pass the pins 69 as shown in Figures 7-9. The pins pass through spacers 71 and are rigidly secured to the bar 64'. Confined between the heads of the pins 69 and the spacers 71 there is the arm 73 which extends out over the front of the frame and is downturned at 75 and has secured to the downturned part 75 the stud 77 which in turn has secured thereto the end of the wire 88, the wire being secured in place by means of the screw 90 threaded into the stud end. A spring 68' is secured at one end to a finger 79 on the arm 73 and at its other end to a finger 81 on the bracket secured to the frame 56'.

The wire 88 passes through the usual casing 92 to the dashboard in the manner shown in Figures 1 and 5. The casing 92 is secured in place in front of the frame 56' by means of the brackets 83 and 85, the bracket 83 being secured directly to the frame 56' and the bracket 85 being secured to the bracket 83 by means of the screw bolt 87. The screw bolt 87 is screwed into the threaded opening 89 in the bracket 85 and the threaded opening 89a in the bracket 83 and binds the U-shaped bracket 85 around the casing 92 rigidly to hold it in place.

The operation of the structure of Figures 7, 8, and 9 is as follows: assuming the parts to be in the full line position in Figure 8 and the operator wishes to open the shutter, he pulls on the knob 94 at the dash, to pull the wire 88 which in turn will cause the arm 73 to be pulled to the right (Figures 7 and 8). The arm 73 is secured to the bar 64' which in turn is pivoted to all of the shutter blades 62' and this movement of the bar will swing in unison all the shutter blades. The spacers 71 between the bar 64' and the arm 73 will move to the right in the opening 117. This movement will further increase the tension on the spring 68'. The wire 88 may be held in position by means of a suitable toothed and notch connection at the instrument board. When it is desired to close the shutter the operator releases the knob 94 from the toothed and notch connection and allows the spring 68' to pull the arm 73 to the left to cause the shutter blades 62' to swing on their pivots 60' to close the shutter.

I claim:

1. In combination with the engine and radiator of an automotive vehicle, an upright U-shaped harness in which the radiator is mounted, the upright arms of said harness having flanges forming a U-shaped cross sectional construction, said radiator being mounted on one of the flanges, the other of said flanges being spaced from the radiator, a shutter slidably and removably mounted in front of the radiator and being retained in the space between the radiator and the flange, and means to operate the shutter.

2. In combination with the engine and radiator of an automotive vehicle, a harness supported on the vehicle, said harness having upstanding arms, each arm having an inwardly turned flange, said radiator mounted on said arms and spaced from said flanges, a removable shutter frame slidable in the space between the flanges and radiator and held in position between the flanges and the radiator, and means to operate the shutter.

3. In combination with the engine and radiator of an automotive vehicle, a harness supported on the vehicle, said harness having upstanding arms, each arm having an inwardly turned flange, said radiator mounted on said arms and spaced from said flanges, a removable shutter frame slidable in the space between the flanges and radiator and held in position between the flanges and the radiator, means secured to the shutter frame and contacting with the harness tightly to hold the shutter frame in position and prevent rattle, and means to operate the shutter.

4. The combination with a radiator core, of a support therefor comprising side walls and a front wall formed integrally with said side walls, the front wall lying in a plane parallel to and spaced forwardly from the front face of the core, a shutter unit mounted in the space between the front wall and front face of the core, and resilient means carried by the shutter unit and adapted to engage said front and side walls for restraining movement of said unit.

5. In combination with a radiator core, a support therefor comprising a member having side walls extending forward from the front face of the core and front walls parallel to and spaced forward from the front face of the core, the extension of the side walls and front walls defining a pair of spaced-apart channels, a shutter unit slidable in said channels, means extending transversely of the opening defined by said channels for supporting said shutter unit in front of the core, and resilient means interposed between the front walls of the shutter unit and front walls of the support for preventing rattling of the unit.

6. In combination with a radiator core and automobile chassis, a substantially U-shaped support constructed of an integral piece of steel having a channel section mounted in a vertical position on said chassis, said channel section having a width greater than that of the core whereby the front flange of the channel section and front face of the core constitute a pair of grooves, a shutter unit comprising side, bottom, and top frame members slidable in said grooves, means supporting said unit in said grooves, and resilient means carried by certain of said frame members for positioning said unit in said grooves and for preventing rattling thereof.

7. In combination with an automobile chassis and a radiator core, a substantially U-shaped support constructed of material having a channel section and secured in a vertical position upon the chassis with the flanges thereof lying in planes parallel to the face of the core and extending inwardly, 90-degree angle irons having one flange secured to the side walls of the core and the other to the rear flange of the support for attaching the core to the support, the side wall of the support having a width greater than the core whereby there is provided a space between the front wall of the core and the front flange of the support, a shutter unit adapted to be slidably mounted in said space, and a pair of arms mounted upon each of the side walls of the unit adapted to engage the interior of the support for positioning said shutter unit in front of the core.

HAROLD W. KLAS.